(12) United States Patent
Sun

(10) Patent No.: US 8,072,753 B2
(45) Date of Patent: Dec. 6, 2011

(54) COMPUTER SYSTEM

(75) Inventor: Hong-Zhi Sun, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 143 days.

(21) Appl. No.: 12/696,114

(22) Filed: Jan. 29, 2010

(65) Prior Publication Data
US 2011/0090643 A1 Apr. 21, 2011

(30) Foreign Application Priority Data
Oct. 21, 2009 (CN) .......................... 2009 2 0312974

(51) Int. Cl.
*H05K 7/20* (2006.01)

(52) U.S. Cl. ........................................ 361/695; 361/694

(58) Field of Classification Search ........... 361/694–695
See application file for complete search history.

(56) References Cited

U.S. PATENT DOCUMENTS

| | | | | |
|---|---|---|---|---|
| 4,717,216 A * | 1/1988 | Hornak | ...................... | 312/326 |
| 4,744,005 A * | 5/1988 | Milani | .................... | 361/679.48 |
| 5,243,218 A * | 9/1993 | Zenitani et al. | ............... | 257/712 |
| 5,596,483 A * | 1/1997 | Wyler | ...................... | 361/679.47 |
| 6,088,223 A * | 7/2000 | Diemunsch | .................... | 361/690 |
| 6,963,489 B2 * | 11/2005 | Askeland et al. | ......... | 361/679.51 |
| 7,447,017 B2 * | 11/2008 | Koo | ............................ | 361/688 |
| 7,990,700 B2 * | 8/2011 | Guo | ........................ | 361/679.48 |
| 7,995,341 B2 * | 8/2011 | Wu et al. | ....................... | 361/695 |
| 2003/0156385 A1* | 8/2003 | Askeland et al. | ............. | 361/687 |
| 2008/0113603 A1* | 5/2008 | Atallah | ........................ | 454/184 |
| 2009/0109610 A1* | 4/2009 | Hirai et al. | ............... | 361/679.46 |

* cited by examiner

*Primary Examiner* — Gregory Thompson
(74) *Attorney, Agent, or Firm* — Altis Law Group, Inc.

(57) ABSTRACT

A computer system includes a cover and a chassis. The chassis includes a bottom plate parallel to the cover, a first side plate, and a second side plate corresponding to the first side plate. A motherboard and a power supply are fixed on the bottom plate. The power supply is adjacent to the first side plate. The motherboard includes a first heat generating component. The power supply includes a first fan module. A second fan module is secured on the first heat generating component. A first airflow inlet is defined in the first fan module. A second airflow inlet is defined in the second fan module. The first and second airflow inlets are perpendicular to the bottom plate. A third airflow inlet is defined in the cover. The second airflow inlet is located between the first heat generating component and the second side plate.

20 Claims, 3 Drawing Sheets

COMPUTER SYSTEM

BACKGROUND

1. Technical Field

The present disclosure relates to computer systems, and particularly to a computer system with high heat dissipation efficiency.

2. Description of Related Art

When a computer system is working, dissipation of heat therefrom is critical. Often, a plurality of fans is mounted in the computer system for this purpose. However, of the presence of multiple installed components in the computer system can block airflow from the fans, reducing heat dissipation efficiency.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
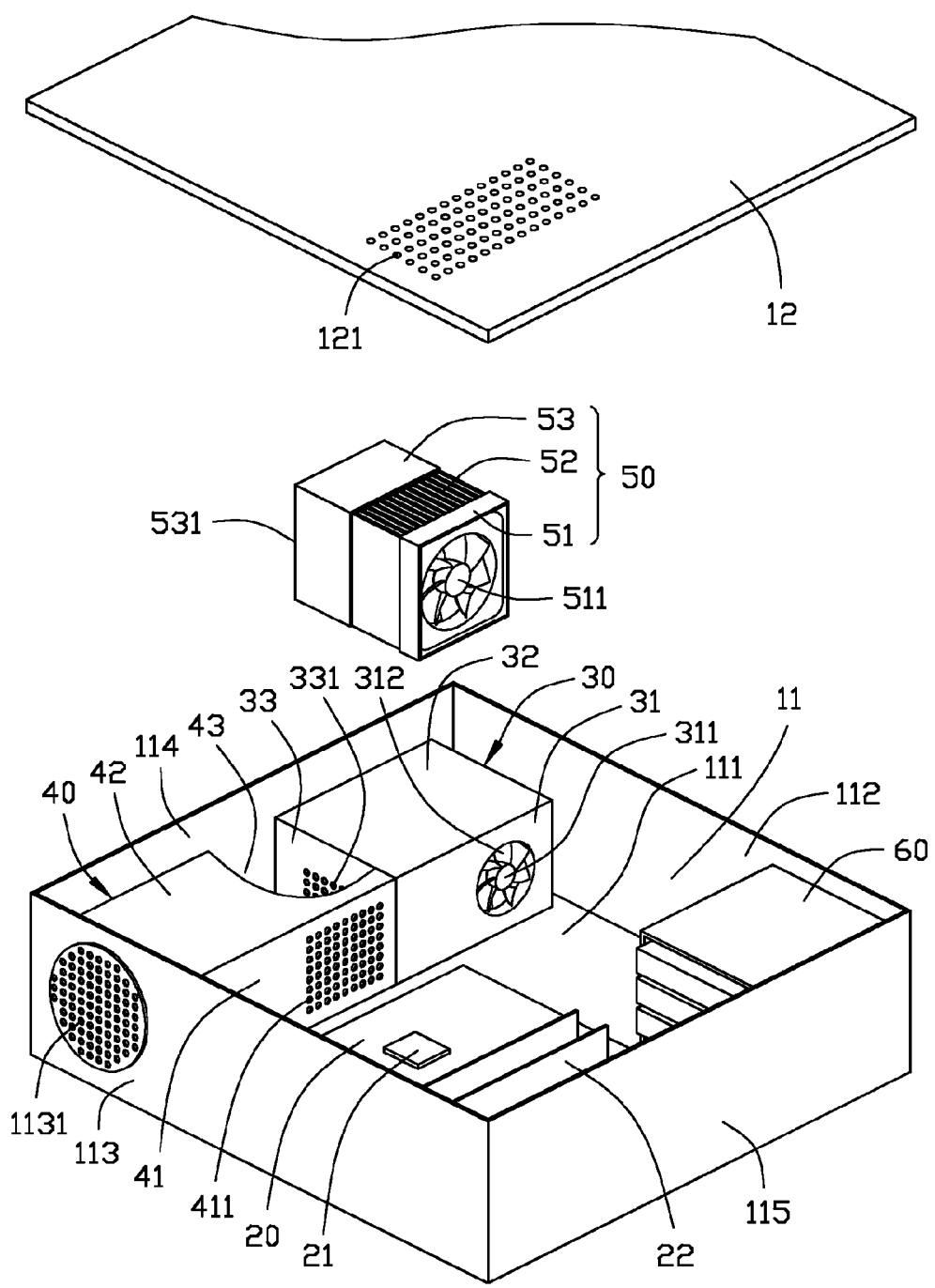
FIG. 1 is an exploded, schematic view of a computer system in accordance with one embodiment.
Figure 2:
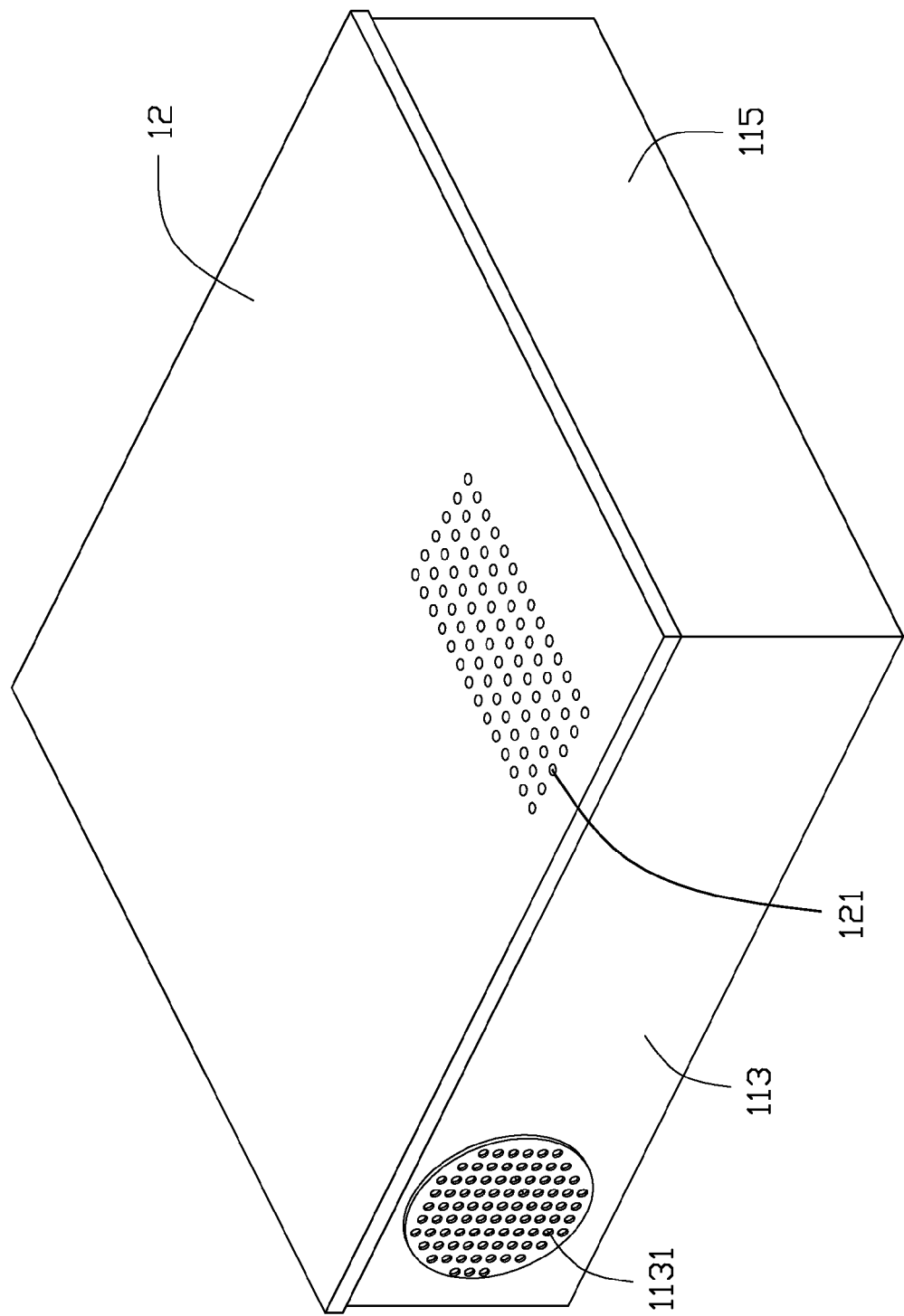
FIG. 2 is an assembled view of the computer system of FIG. 1.

Referring to FIG. 1 and FIG. 2, a computer system includes a chassis 11 and a cover 12. The chassis 11 includes a bottom plate 111, a front plate 112, a rear plate 113 parallel to the front plate 112, a first side plate 114 and a second side plate 115 parallel to the first side plate 114.

A motherboard 20 is mounted on the bottom plate 11. The motherboard 20 is adjacent to the rear plate 113 and the second side plate 115. The motherboard 20 includes a first heat generating component 21 and a second heat generating component 22. The first heat generating component 21 may be, for example, a central processing unit (CPU). The second heat generating component 22 may be, for example, a Peripheral Component Interconnect (PCI) card.

A power supply 30 is fixed on the bottom plate 111 and adjacent to the front plate 112. The power supply 30 includes a first wall 31, a second wall 32 parallel to the bottom plate 111, and a third wall 33 parallel to the rear plate 113. A first fan module 311 is secured on the first wall 31. A first airflow inlet 312 is defined in the first fan module 311. The first wall 31 with the first airflow inlet 312 is perpendicular to the bottom plate 111. A first airflow outlet 331 is defined in the third wall 33.

A first airflow shield 40 is installed on the bottom plate 111. The first airflow shield 40 includes a first conducting plate 41 and a second conducting plate 42 extending from the first conducting plate 41. The second conducting plate 42 is perpendicular to the first conducting plate 41. The first and second conducting plates 41, 42 are rectangular. The first conducting plate 41 aligns with the first wall 31 and contacts the bottom plate 111. The second conducting plate 42 aligns with the second wall 32 and contacts the first side plate 114. An airflow channel 43 is formed among the first conducting plate 41, the second conducting plate 42, the bottom plate 111 and the first side plate 114. A ventilation hole 1131 is defined in the rear plate 113. An inlet 411 is defined in the first conducting plate 41.

A second fan module 50 is secured on the first heat generating component 21. The second fan module 50 includes a fan 51, a heat sink 52 and a second airflow shield 53. A second airflow outlet 531 is defined in the second airflow shield 53. The second airflow outlet 531 is aligned with the inlet 411. A second airflow outlet 531 is defined by the fan 51. The second airflow inlet 511 is perpendicular to the bottom plate 111.

A third heat generating component 60 is fixed on the front plate 112 and adjacent to the second side plate 115. The third heat generating component 60 may be a hard disk drive module.

A third airflow inlet 121 is defined in the cover 12 corresponding to the second heat generating component 22. The second airflow inlet 511 is located between the first heat generating component 21 and the second side plate 115. A projection of the third airflow inlet 121 on the bottom plate 111 is laid between the second airflow inlet 511 and the second side plate 115. A projection of the third airflow inlet 121 on the bottom plate 111 is located between the first airflow inlet 312 and the second side plate 115.

Figure 3:
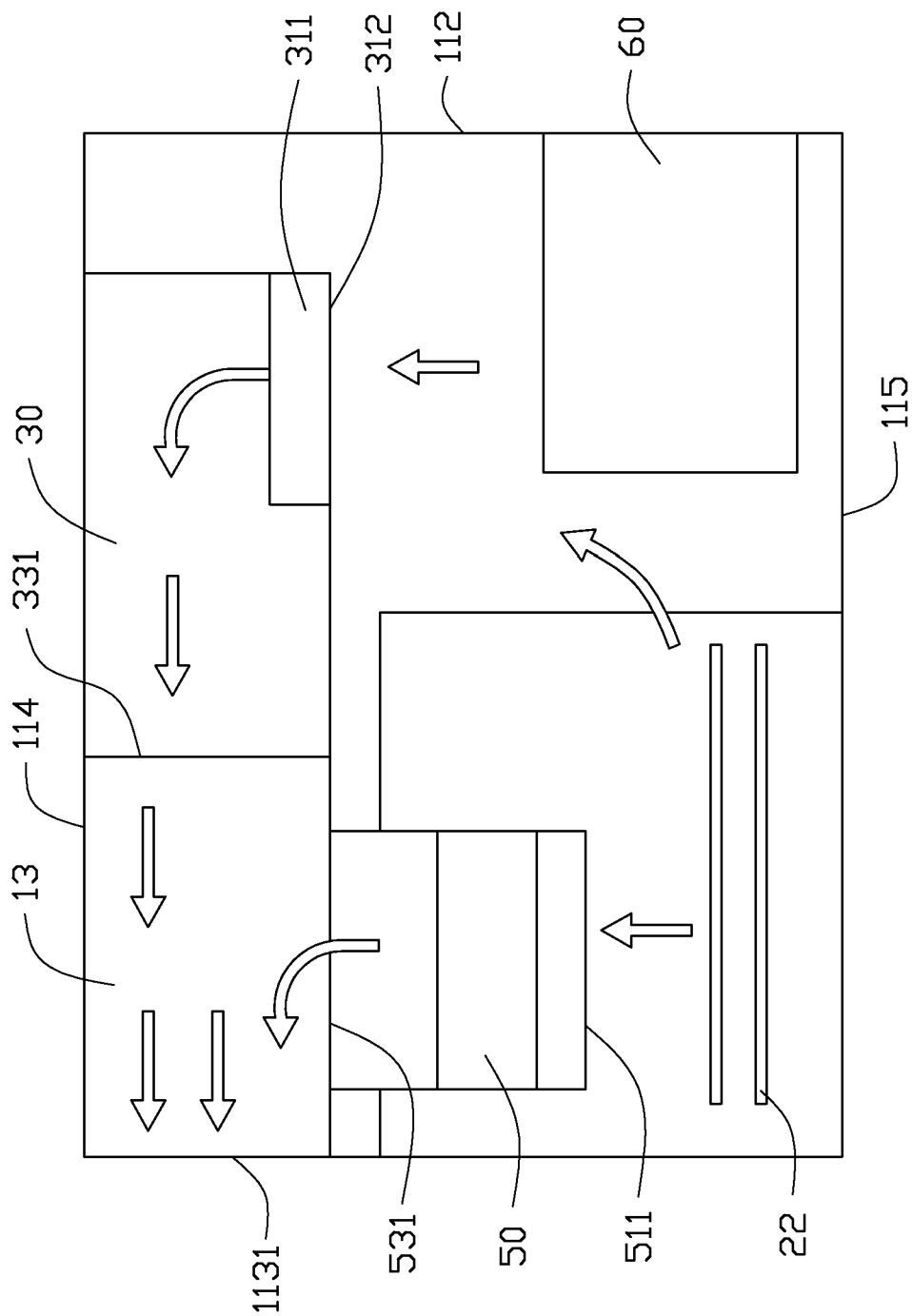
FIG. 3 is a schematic view of the computer system of FIG. 1.

Referring to FIG. 1 and FIG. 3, when the heat generating components operate, the fan 51 and a fan in the power supply 30 operate correspondingly. Airflow with a lower temperature outside the computer system enters from the third airflow inlet 121. Part of the airflow flows towards the second airflow inlet 511, the inlet 411, and the airflow channel 43 dissipating heat from the first and second heat generating components 21, 22. Another part of the airflow flows towards the first airflow inlet 312, the first airflow outlet 331, and the airflow channel 43 to dissipate heat from the third heat generating component 60. Finally, the airflow flows towards the ventilation hole 1131 and the exterior of the computer system.

While the present disclosure has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

What is claimed is:

1. A computer system comprising:
   a cover;
   a chassis, the chassis comprising a bottom plate parallel to the cover, a first side plate; a second side plate corresponding to the first side plate; a motherboard and a power supply fixed on the bottom plate; the power supply adjacent to the first side plate; the motherboard comprising a first heat generating component; the power supply comprising a first fan module and a second fan module secured on the first heat generating component; a first airflow inlet defined in the first fan module; a second airflow inlet defined in the second fan module; wherein the first and second airflow inlets are perpendicular to the bottom plate, a third airflow inlet defined in the cover, the second airflow inlet is between the first heat generating component and the second side plate, a projection of the third airflow inlet on the bottom plate extends between the second airflow inlet and the second side plate, and a ventilation hole is defined in the chassis.

2. The computer system of claim 1, wherein a projection of the third airflow inlet on the bottom plate extends between the first airflow inlet and the second side plate.

3. The computer system of claim 1, wherein the first airflow inlet is parallel to the second airflow inlet.

4. The computer system of claim 1, wherein the motherboard comprises a second heat generating component corresponding to the third airflow inlet.

5. The computer system of claim 1, further comprising a first airflow shield; an airflow channel formed around the first airflow shield and the chassis; a first airflow outlet defined in the power supply; a second airflow outlet defined in the second fan module; wherein the airflow channel connects the first and second airflow outlets and can receive airflow from the first and second airflow outlets, and the ventilation hole is capable of allowing the airflow to escape.

6. The computer system of claim 5, wherein the first airflow shield comprises a first conducting plate and a second conducting plate extending from the first conducting plate, and wherein the first conducting plate, the second conducting plate, and the bottom plate and the first side plate cooperatively form the airflow channel.

7. The computer system of claim 6, wherein the power supply comprises a first wall, a second wall, and a third wall that is connected to the first wall and the second wall, wherein the first airflow outlet is defined in the third wall.

8. The computer system of claim 7, wherein a second airflow inlet is defined in the first conducting plate corresponding to the second airflow outlet.

9. The computer system of claim 8, wherein the second fan module comprises a second airflow shield to guide airflow of the second fan module, wherein the second airflow outlet is defined in the second airflow shield.

10. The computer system of claim 5, wherein the chassis comprises a rear plate extending from the bottom plate, the airflow channel connects with the rear plate, and the ventilation hole is defined in the rear plate corresponding to the airflow channel.

11. A computer system comprising:
a cover;
a chassis, the chassis comprising:
    a bottom plate parallel to the cover;
    a first side plate;
    a second side plate corresponding to the first side plate;
    wherein a motherboard and a power supply are fixed on the bottom plate; the power supply is adjacent to the first side plate; the motherboard comprises a first heat generating component; the power supply comprises a first fan module, a second fan module is secured on the first heat generating component; a first airflow inlet is defined in the first fan module; a second airflow inlet is defined in the second fan module; wherein the first and second airflow inlets are perpendicular to the bottom plate, a third airflow inlet is defined in the cover, the second airflow inlet is between the first heat generating component and the second side plate, the first airflow inlet is parallel to the second airflow inlet, and a ventilation hole is defined in the chassis.

12. The computer system of claim 11, wherein a projection of the third airflow inlet on the bottom plate extends between the second airflow inlet and the second side plate.

13. The computer system of claim 11, wherein a projection of the third airflow inlet on the bottom plate extends between the first airflow inlet and the second side plate.

14. The computer system of claim 11, wherein the motherboard comprises a second heat generating component corresponding to the third airflow inlet.

15. The computer system of claim 11, further comprising a first airflow shield; wherein an airflow channel is formed around the first airflow shield and the chassis; a first airflow outlet is defined in the power supply; a second airflow outlet defined in the second fan module; the airflow channel connects with the first and second airflow outlets, the airflow channel is capable of receiving airflow from the first and second airflow outlets, and the ventilation hole is capable of allowing the airflow to escape.

16. The computer system of claim 15, wherein the first airflow shield comprises a first conducting plate and a second conducting plate extending from the first conducting plate, and wherein the first conducting plate, the second conducting plate, the bottom plate and the first side plate cooperatively form the airflow channel.

17. The computer system of claim 16, wherein the power supply comprises a first wall, a second wall and a third wall that is connected to the first wall and the second wall, and the first airflow outlet is defined in the third wall.

18. The computer system of claim 17, wherein a second airflow inlet is defined in the first conducting plate corresponding to the second airflow outlet.

19. The computer system of claim 18, wherein the second fan module comprises a second airflow shield to guide airflow of the second fan module, wherein the second airflow outlet is defined in the second airflow shield.

20. The computer system of claim 15, wherein the chassis comprises a rear plate extending from the bottom plate, the airflow channel connects with the rear plate, and the ventilation hole is defined in the rear plate corresponding to the airflow channel.

* * * * *